July 9, 1963   M. G. LOWENSTEIN ETAL   3,096,650
A.C. BIASED THERMISTOR BOLOMETERS
Filed Aug. 29, 1961

INVENTOR.
MARK G. LOWENSTEIN
BY ROBERT W. ASTHEIMER

*Robert Ames Norton*
ATTORNEY

United States Patent Office 3,096,650
Patented July 9, 1963

3,096,650
A.C. BIASED THERMISTOR BOLOMETERS
Mark G. Lowenstein, Norwalk, and Robert W. Astheimer, Westport, Conn., assignors to Barnes Engineering Company, Stamford, Conn., a corporation of Delaware
Filed Aug. 29, 1961, Ser. No. 134,718
3 Claims. (Cl. 73—355)

This invention relates to improved thermistor bolometer circuits and more particularly to thermistor bolometer circuits using A.C. bias.

Thermistor bolometers have been used extensively as radiation detectors particularly in the infrared as they respond by converting absorbed radiation to heat, thereby changing resistance and are useful therefore with radiation of practically any wavelength which the thermistor can absorb.

In the main the thermistors are materials of high temperature coefficient, usually negative, such as for example mixtures of oxides of manganese, nickel, cobalt, etc. Thermistors of semiconductor elements such as germanium and silicon are a more recent development. Ordinarily bolometers use two thermistor flakes in a bridge circuit with a suitable bias potential. Usually one of the thermistors is exposed to radiation and the other shielded from radiation to constitute a reference and minimize effects of changes in ambient temperature. For some purposes both thermistors have been irradiated, one flake acting as a reference flake for the other and thus comparing radiation from one source to that of another. However, the largest single use of thermistor bolometers is in the instruments in which one of the flakes is shielded from radiation. Up to now D.C. bias on the thermistors has been standard. Although proposals to use A.C. bias have been put forward they have encountered severe practical problems. It is with a solution of these problems in A.C. bias thermistor bolometers that the present invention deals.

The advantages of A.C. biasing of thermistor bolometers are great for then A.C. amplifying and processing electronic circuits may be used with saving in amplifier complexity and cost and improvement in reliability. Also when the bolometer is used in a radiometer which is observing a single object or target and not comparing radiations therefrom with a separate radiation standard A.C. bias permits elimination of chopping of the radiation which was hitherto necessary in order to produce an A.C. output that could be processed in A.C. electronic circuits. Chopping of the radiation beam not only increases the cost and complexity of radiometers employing it but reduces bolometer sensitivity which is sometimes a very important consideration. A.C. biased thermistor bolometers also permit the switching of a large number of bolometers successively into a single set of electronic processing circuits and this also is an important field which would be opened if a reliable A.C. biased bolometer is available. The field of switching a large number of bolometers is not claimed in the present invention but constitutes the subject matter of the copending application of Gerald Jankowitz, Serial No. 134,372, filed August 28, 1961. Mention is made in the present specification only as representing another field in which the improved A.C. biased thermistor bolometers of the present invention may be used.

Theoretically the circuit for an A.C. biased thermistor bolometer appears quite simple. A.C. at a suitable frequency is fed from the secondary of a center tapped transformer into the bolometer with the two flakes in series. A variable resistance may be used to balance the resulting bridge. Unfortunately the simple A.C. biased bridge is not practical because once the bridge is balanced it does not stay balanced. While there are several factors contributing toward unbalancing of the bridge there is one major factor the effects of which predominate over all of the other factors. This is the variation with temperature of absolute resistance of the thermistor flakes. The variation of the thermistor flakes $dR/dT$, with temperature is the very reason for their being and they are chosen to have as great a temperature coefficient as possible. However, it is not possible to find two thermistor flakes, even from the same batch, that will maintain the same absolute resistance over a temperature range. Although the incremental response to radiation, $dR/dT$, is relatively constant. So practically an A.C. bridge will not stay balanced. This might not be too serious in radiometers in which radiation is chopped but for radiometers which use unchopped radiation, changes in the bridge balance with changes in ambient temperature introduce so large an unbalance voltage as to practically preclude the use of A.C. biased thermistors in some of the instruments of the above type.

Before considering the solution of the A.C. biasing problem by means of the present invention it might be pointed out that the same problem does not occur, or occurs very rarely, with D.C. biased thermistor bolometers. If a D.C. biased thermistor bolometer is exposed to chopped radiation and A.C. electronic amplifying and processing circuits are used, the bolometer bridge does not have to remain in balance because the comparison effected by chopping produces the only signal which the amplifying circuits can see. The D.C. component of the bridge output is not amplified. With A.C. the situation is entirely different. The amplifying circuits see the bridge unbalance, now an A.C. signal, just as much as they see any signal resulting from radiation on one of the flakes. This large signal severely limits the amount of amplification which may be used. This is a reason why A.C. bias has not been generally used in spite of the many advantages it has to offer.

The present invention utilizes a basic principle of thermistors which has not been used in this way before. This is the principle that the resistance of a thermistor of given composition depends only on temperature. Accordingly, if the reference flake has a higher resistance, for example at the lowest ambient temperature used, then the other flake unbalances due to temperature changes can be compensated by heating the reference flake. Heating can be effected by D.C. because this does not affect the A.C. output of the bolometer bridge. The basic circuit is quite simple and will be described in connection with the drawings. However, it is necessary in many cases to change the amount of heating. This can be effected either by taking A.C. bridge unbalance as an error signal and varying periodically the D.C. heating by suitable servo loops having response times long compared to the signal frequency. In the broadest aspects of the present invention such circuits are included. However, in a more specific aspect a circuit has been developed which without external servo loops decreases bridge unbalance over a reasonable range of ambient temperatures to a point where, with many instruments, operation is entirely satisfactory. A great economy in circuitry and increased reliability is thus made possible and this constitutes a preferred embodiment of the present invention.

The preferred embodiment is based on a surprising discovery which has not as yet lent itself to rigorous mathematical explanation. Accordingly, the present invention is not intended to be limited in its preferred form to any theory of why the improved result is obtained. The discovery was made that when an A.C. biased thermistor bridge was balanced at one temperature and the temperature then changed and the bridge again balanced by changing the D.C. potential applied for heating purposes, balance resulted at nearly the same current as required at the previous temperature and this extraordinary phenomenon was observed over a wide range of temperatures from −20° C. to +50° C. Accordingly, the preferred embodiment of the present invention utilizes a substantially constant current for heating the reference flake. This is not to say that the current for best compensation is going to be identical with all thermistor configurations and all thermistor materials but once the bridge is balanced at the optimum current for a particular combination it remains adequately balanced if this current is maintained reasonably constant.

A constant current source is a theoretical impossibility. All such sources are more or less close approximations thereto. In this respect the present invention is no different than any other so called constant current source. These sources in general depend on having a resistance in the source in series with the external load which is higher than that of the load resistance. Then changes in the load resistance will produce much smaller changes in current. The present invention deals with practical instruments and it has been found that unless the resistance in the current source is at least about four times that of the resistance of the thermistor flake to be heated the advantages of the present invention are not adequately realized. Of course, the higher the ratio the more constant the current and for this reason the 4:1 resistance ratio should be applied to the highest resistance that the reference thermistor flake will ever have. This in turn means the resistance of the flake at the lowest temperature at which the instrument is to be used.

As the temperature rises and the resistance of the reference flake drops the degree of constancy of current increases, for example, with a source having a resistance four times that of the thermistor flake at −20° C., this ratio may be much nearer 100:1 at 50° C. As the ratio increases the degree of bridge stability with temperature changes also increases and, therefore, when bolometers are to be used over a much narrower temperature range, which means that the maximum resistance of the reference flake is very much less, it is practical to use source resistances considerably more than four times as great. There is no theoretical upper limit but there is a practical one. As source resistance goes up for a particular current the voltage also has to go up and this sets a practical and economic limit. Therefore, the preferred modification of the present invention will ordinarily be used with as high a source resistance as is compatible with reasonable source voltages.

The invention will be described in detail in conjunction with a simple circuit employing the preferred embodiment of the present invention and in connection with the drawings in which.

Figure 1:
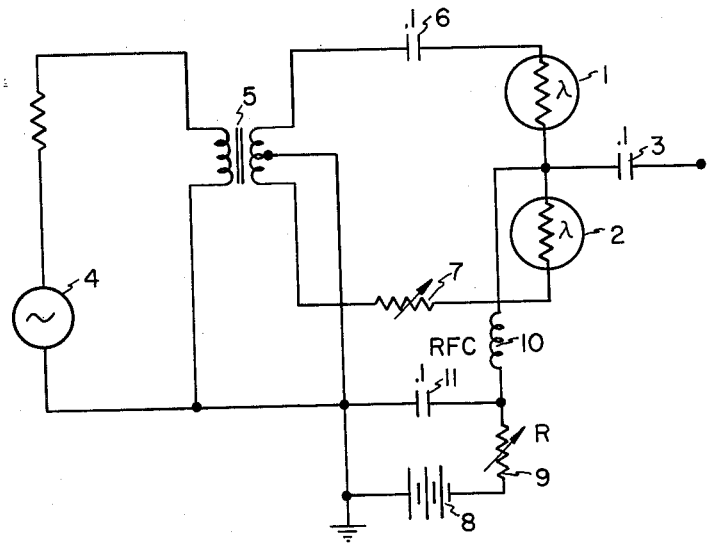
FIG. 1 is a simplified schematic of an A.C. biased thermistor bolometer.

FIG. 1 shows a bolometer in which an active thermistor flake 1 and a reference thermistor flake 2 are arranged in conventional bridge form with a differential output through a capacitor 3. A.C. bias for the two thermistors is provided by a suitable A.C. generator 4 feeding the primary of a transformer 5, the center tapped secondary of which is connected through a capacitor 6 to the thermistor flake 1 and through a variable resistance 7 to thermistor 2. The center tap is shown grounded. From ground a direct current source represented by the battery 8 is connected through a variable resistance 9 and choke 10 to the junction of the two thermistor flakes. The battery is by-passed for A.C. by the capacitor 11.

FIG. 1 represents a bolometer biased by a fairly high A.C. frequency, for example, 456 kc. As a result the choke 10 is shown as an air core radio frequency choke. When the bias is first applied at a temperature near that at which it will operate the bridge is nulled by adjustment of the rheostat 7. When the circuit of FIG. 1 is operated the curves are obtained. The initial balancing is effected at about 46° C. Resistance 9 is adjusted to give a current of 500 μa. It will be noticed that the D.C. heating current passes only through the reference thermistor flake 2 as it is stopped from flowing through the active flake 1 by the capacitor 6, which, however, introduces negligible impedance at the A.C. bias frequency. Bridge balance was obtained with and without flake heating at 46° C. The temperatures were then changed and readings taken every degree down to 22° C.

Figure 2:
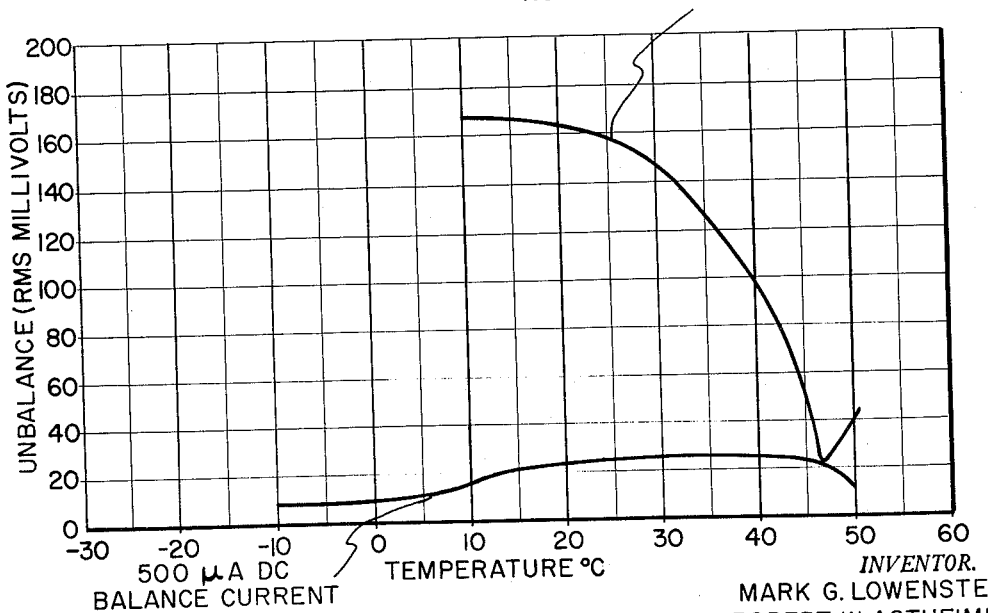
FIG. 2 are curves with temperature of unbalance with no current heating and unbalance with constant current heating.

FIG. 2 shows the curves of bridge unbalance reading with and without heating, the curves being normalized to the same initial value. It will be noticed that even when perfectly balanced there is some current which is due to factors other than the bridge balancing. It will also be seen that when there is no heating as the temperature is changed the bridge unbalance voltage increases very rapidly and at 22° C. is almost 800 percent of the value at balance. The curve for the bridge with heated flake shows very much less variation, about 25 percent.

We claim:
1. A thermistor bolometer comprising in combination at least two flakes connected in series at least one flake being an active flake and the second a reference flake, a source of A.C. bias for the flakes, a differential output between the flakes and means for applying a D.C. heating voltage to one flake only.

2. A bolometer according to claim 1 in which the means for applying D.C. current is a substantially constant current means.

3. A bolometer according to claim 2 in which one of the flakes is connected to the source of A.C. bias voltage through a capacitor having negligible impedance at the bias frequency and the heating current is applied to the junction of the flakes through an inductance with high impedance at the bias frequency.

References Cited in the file of this patent
UNITED STATES PATENTS

| | | |
|---|---|---|
| 2,624,012 | English | Dec. 30, 1952 |
| 2,650,496 | Middleton | Sept. 1, 1953 |